(12) United States Patent
Aiura et al.

(10) Patent No.: US 7,872,460 B2
(45) Date of Patent: Jan. 18, 2011

(54) METHOD FOR DETECTING OUTPUT SHORT CIRCUIT IN SWITCHING REGULATOR

(75) Inventors: Masami Aiura, Sendai (JP); Kanji Egawa, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 326 days.

(21) Appl. No.: 12/198,099

(22) Filed: Aug. 25, 2008

(65) Prior Publication Data

US 2010/0045250 A1    Feb. 25, 2010

(51) Int. Cl.
*G05F 1/00* (2006.01)
(52) U.S. Cl. .................................... 323/284
(58) Field of Classification Search ............... 323/908, 323/222, 223, 284, 285, 259, 344, 283; 361/15, 361/17
See application file for complete search history.

(56) References Cited

U.S. PATENT DOCUMENTS

| | | | |
|---|---|---|---|
| 6,788,513 B2 * | 9/2004 | Kimura | 361/97 |
| 7,292,016 B2 | 11/2007 | Wake | |
| 2006/0290333 A1 * | 12/2006 | Fukushi et al. | 323/277 |
| 2007/0177322 A1 * | 8/2007 | Jacobs | 361/100 |
| 2007/0216372 A1 * | 9/2007 | Weng et al. | 323/222 |

FOREIGN PATENT DOCUMENTS

JP    2003-033010 A    1/2003

* cited by examiner

*Primary Examiner*—Adolf Berhane
*Assistant Examiner*—Emily Pham
(74) *Attorney, Agent, or Firm*—Charles Bergere

(57) ABSTRACT

A method and circuit for accurately detecting an output short circuit in a switching regulator. A first transistor and a second transistor are connected in series and driven in a complementary manner. A comparator compares output current, which is generated when the first and second transistors are driven, with a short circuit detection threshold to generate a first short circuit detection signal. A timing controller retrieves the first short circuit detection signal generated by the comparator at a predetermined time to generate a second short circuit detection signal.

13 Claims, 3 Drawing Sheets

METHOD FOR DETECTING OUTPUT SHORT CIRCUIT IN SWITCHING REGULATOR

BACKGROUND OF THE INVENTION

The present invention relates to a method for detecting an output short circuit in a switching regulator, and more particularly, to a method and circuit for detecting an output short circuit in a DC-DC converter.

Various types of power supply circuits are known in the prior art. For example, U.S. Pat. No. 7,292,016 describes a power supply circuit using a DC-DC converter, and Japanese Laid-Open Patent Publication No. 2003-33010 describes a multi-output power supply circuit implementing a short circuit detection function. FIG. 1 is a schematic circuit diagram of a conventional step-up type DC-DC converter 10 implementing a short circuit detection function. The DC-DC converter 10 includes first and second transistors T1 and T2, which are connected in series, and a PWM controller 20, which generates first and second drive signals $D_H$ and $D_L$ for respectively driving the first and second transistors T1 and T2. A coil L is connected to a node Nsw between the two transistors T1 and T2. Input voltage VIN is applied to the coil L. The coil L is connected to ground via a capacitor C1.

The first and second transistors T1 and T2 are each formed by an N-channel MOS transistor. The first transistor T1 includes a parasitic body diode D1 connected between its source (node Nsw) and drain. The second transistor T2 includes a parasitic body diode D2 connected between its source and drain (node Nsw). The drain of the first transistor T1 is connected to an output terminal 12, and the output terminal 12 is connected to ground via a capacitor C2. The source of the second transistor T2 is connected to ground.

The PWM controller 20 monitors output voltage OUT of the DC-DC converter 10 that is generated at the output terminal 12 to control the first and second transistors T1 and T2 in a complementary manner. When the second transistor T2 is activated (the first transistor T1 is deactivated), current energy is accumulated in the coil L, and current $I_L$ flows from the capacitor C1 via the coil L and the second transistor T2 to ground. When the first transistor T1 is activated (the second transistor T2 is deactivated), current $I_H$, which is in accordance with the energy accumulated in the coil L, flows via the first transistor T1 to the output terminal 12. This increases the output voltage OUT. The ON/OFF ratio (drive duty) of the first and second transistors T1 and T2 is set at a value that is required for increasing the output voltage OUT from the input voltage VIN to a desired level.

The DC-DC converter 10 further includes a comparator 30, which compares the output current Iout with a short circuit detection threshold Dth to generate a short circuit detection signal Sdc. Based on the short circuit detection signal Sdc, the PWM controller 20 determines whether or not the capacitor C2 is short circuited, that is, whether or not an output short circuit is occurring. When an output short circuit is occurring, the PWM controller 20 deactivates the transistors T1 and T2.

FIG. 2 is a timing diagram illustrating the short circuit detection function of the DC-DC converter 10.

First, the second transistor T2 is activated, and current energy is accumulated in the coil L. At time ta, the first transistor T1 is activated and the second transistor T2 is deactivated. As a result, current $I_H$, which is in accordance with the current energy accumulated in the coil L (the current $I_L$ when the activated transistor is switched), flows to the output terminal 12. The current $I_H$ charges the capacitor C2 and increases the output voltage OUT. This gradually decreases the current $I_H$. Thereafter, the first and second transistors T1 and T2 are alternately activated at times tc, td, and te. This keeps the output voltage OUT constant.

When an output short circuit occurs, the output current Iout increases in a proportional manner as shown by the broken line in FIG. 2. More specifically, when the first transistor T1 is deactivated, some of the current $I_L$ flows to ground via the body diode D1 of the first transistor T1 and the short circuited capacitor C2. When the first transistor T1 is activated, the current $I_H$ flows to ground via the first transistor T1 and the capacitor C2. Accordingly, even after the first transistor T1 is activated, the output current Iout continues to increase. The comparator 30 constantly checks whether or not the output current Iout has exceeded the short circuit detection threshold Dth. For example, in FIG. 2, the output current Iout exceeds the threshold Dth at time tb. In this case, the comparator 30 generates the short circuit detection signal Sdc with a high level. In response to the short circuit detection signal Sdc, the PWM controller 20 determines that an output short circuit is occurring.

However, the short circuit detection function of the conventional DC-DC converter 10 has a shortcoming in that noise may cause erroneous detections. This problem will now be discussed in detail.

To protect a load that is connected to the DC-DC converter 10 from excessive current (short circuit current), it is preferable that the short circuit detection threshold Dth be set to a value that is close to the peak current Imax of the first transistor T1 (refer to FIG. 2). Thus, there is only a slight difference between the short circuit detection threshold Dth and the peak current Imax, and the detection margin Md provided for the short circuit detection operation is small. The small detection margin Md may result in a short circuit being determined as occurring even though there is actually no short circuit. For example, if the first transistor T1 is activated at time td, noise may cause the current $I_H$ flowing to the first transistor T1 to become greater than or equal to the short circuit detection threshold Dth. In such a case, the comparator 30 would generate the short circuit detection signal Sdc with a high level. Thus, although a short circuit is actually not occurring, the PWM controller 20 would determine that a short circuit is occurring. To prevent erroneous detection, the coil L may be enlarged. Enlargement of the coil L would decrease the speed in which current energy is accumulated in the coil L, that is, decrease the inclination of the current $I_L$ shown in FIG. 2. This would reduce fluctuations in the current $I_H$ caused by noise when the first transistor T1 is activated. However, enlargement of the coil L would increase the circuit scale. Accordingly, enlargement of the coil L would be impractical.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
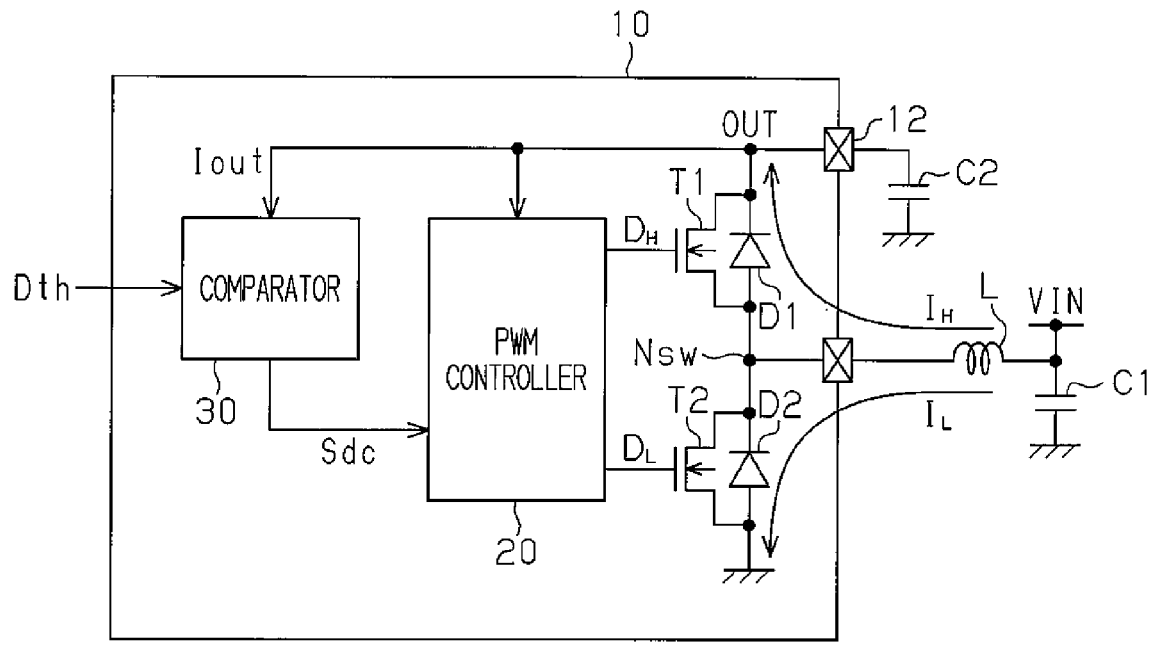
FIG. 1 is a schematic circuit diagram of a conventional step-up type DC-DC converter implementing a short circuit detection function.

In the drawings, like numerals are used for like elements throughout.

The present invention provides a method for accurately detecting an output short circuit in a switching regulator and a switching regulator including such a detection function.

A first aspect of the present invention is a switching regulator including a first transistor, a second transistor connected in series with the first transistor and driven in a complementary manner with the first transistor, and a comparator that compares output current, generated when the first and second transistors are driven, with a short circuit detection threshold and generates a first short circuit detection signal. A timing controller retrieves the first short circuit detection signal generated by the comparator at a predetermined timing and generates a second short circuit detection signal.

A second aspect of the present invention is a switching regulator including a first transistor, a second transistor connected in series with the first transistor, a PWM controller that is connected to the first and second transistors and that drives the first and second transistors in a complementary manner, and a comparator that compares output current, generated when the first and second transistors are driven, with a short circuit detection threshold and generates a first short circuit detection signal. A timing controller is connected between the comparator and the PWM controller and retrieves the first short circuit detection signal after a predetermined period from when the first transistor is activated to generate a second short circuit detection signal.

A third aspect of the present invention is a method for detecting output short circuit in a switching regulator. The switching regulator includes a first transistor and a second transistor, which is connected in series with the first transistor and driven in a complementary manner with the first transistor. The method includes generating a first short circuit detection signal by comparing output current, generated when the first and second transistors are driven, with a short circuit detection threshold. The method also includes generating a second short circuit detection signal by retrieving the first short circuit detection signal at a predetermined timing.

Other aspects and advantages of the present invention will become apparent from the following description, taken in conjunction with the accompanying drawings, illustrating by way of example the principles of the invention.

Figure 3:
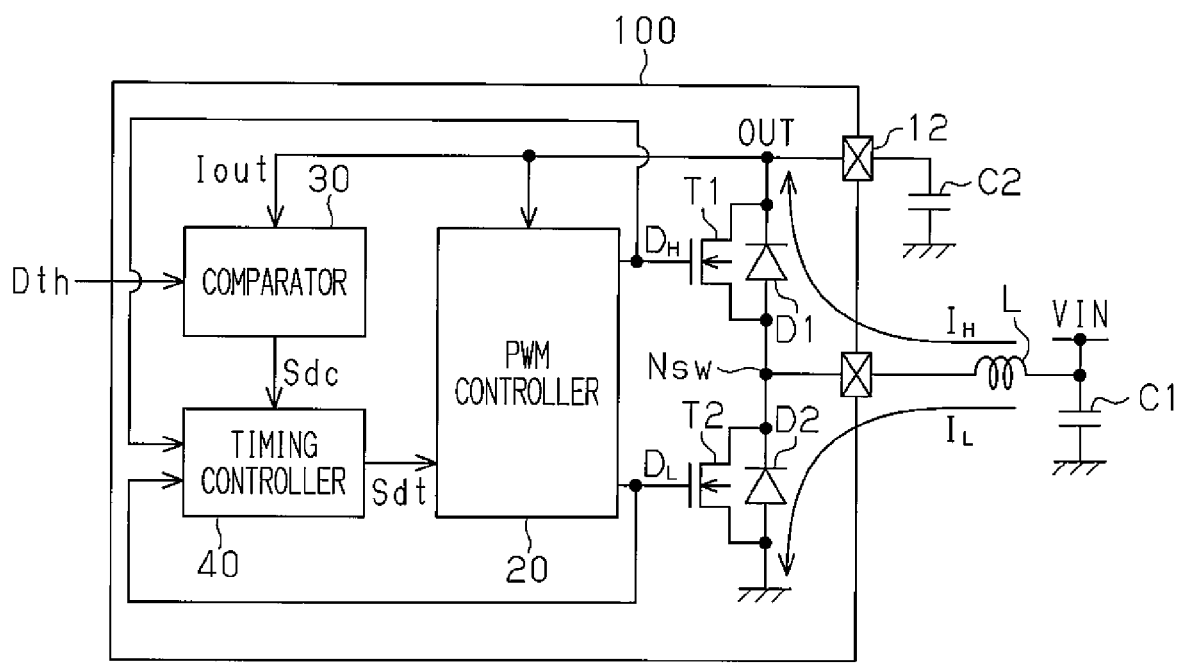
FIG. 3 is a schematic circuit diagram showing a preferred embodiment of a step-up type DC-DC converter implementing a short circuit detection function according to the present invention.

A preferred embodiment of a switching regulator according to the present invention will now be discussed with reference to FIGS. 3 to 5. FIG. 3 is a schematic circuit diagram showing a step-up type DC-DC converter 100 implementing a short circuit detection function. In the same manner as the DC-DC converter shown in FIG. 1, the DC-DC converter 100 includes a first transistor T1, a second transistor T2, a PWM controller 20, and a comparator 30. A coil L is connected to a connection node Nsw between the first and second transistors T1 and T2. Input voltage VIN is applied to the coil L. The coil L is also connected to ground via a capacitor C1. The first and second transistors T1 and T2 respectively include body diodes D1 and D2.

The first and second transistors T1 and T2 are driven in a complementary manner by first and second drive signals $D_H$ and $D_L$ generated by the PWM controller 20. When the second transistor T2 is activated (the first transistor T1 is deactivated), current energy is accumulated in the coil L, and current $I_L$ flows from the capacitor C1 via the coil L and the second transistor T2 to ground. When the first transistor T1 is activated (the second transistor T2 is deactivated), current $I_H$, which is in accordance with the energy accumulated in the coil L, flows via the first transistor T1 to the output terminal 12. The current $I_H$ charges the capacitor C2 and increases the output voltage OUT. The ON/OFF ratio (i.e., duty ratio) of the first and second transistors T1 and T2 is set at a required value for increasing the output voltage OUT from the input voltage VIN to a desired level. The comparator 30 compares the output current Iout with a short circuit detection threshold Dth and generates a first short circuit detection signal Sdc with a high level when the output current Iout is greater than or equal to the threshold Dth. To protect a load that is connected to the DC-DC converter 100 from excessive current (short circuit current), the short circuit detection threshold Dth is set to a value that is close to the peak current Imax of the first transistor T1 (refer to FIG. 5). The comparator 30 constantly monitors the output current Iout.

In the preferred embodiment, the DC-DC converter 100 includes a timing controller 40 connected between the comparator 30 and the PWM controller 20. The timing controller 40 receives the first short circuit detection signal Sdc from the comparator 30 and the first and second drive signals $D_H$ and $D_L$ from the PWM controller 20 to retrieve the first short circuit detection signal Sdc and generate a second short circuit detection signal Sdt based on the activated periods of the first and second transistors T1 and T2. In other words, the timing controller 40 retrieves the first short circuit detection signal Sdc generated by the comparator 30 at a predetermined timing (or during a predetermined period). The second short circuit detection signal Sdt generated by the timing controller 40 is provided to the PWM controller 20. Based on the second short circuit detection signal Sdt, the PWM controller 20 determines whether or not the capacitor C2 is short circuited, that is, whether or not an output short circuit is occurring. When an output short circuit is occurring, the PWM controller 20 deactivates the transistors T1 and T2.

Figure 4:
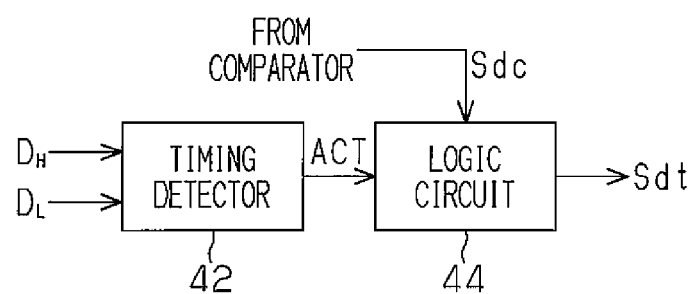
FIG. 4 is a schematic block circuit diagram of a timing controller shown in FIG. 3.

As shown in FIG. 4, the timing controller 40 includes a timing detector 42 and a logic circuit 44. The timing detector 42 detects activation of the first transistor T1 based on the first drive signal $D_H$ and drive an activation signal ACT in accordance with the detection. For example, the timing detector 42 detects activation of the first transistor T1 (deactivation of the second transistor T2) and asserts the activation signal ACT when the activated period of the first transistor T1 exceeds a first elapsed time E1. Further, the timing detector 42 re-negates the activation signal ACT before the activation period of the first transistor T1 ends. In other words, the activation signal ACT is asserted during a predetermined period Tx1 (arbitrary period) from the first elapsed time E1 but is negated before the first transistor T1 is deactivated. In the preferred embodiment, a negation level corresponds to, for example, a low logic level, and an assertion level corresponds to, for example, a high logic level. Based on an activation period ON1 (design value) of the first transistor T1 that is in accordance with the duty ratio, the first elapsed time E1 is set to satisfy the equation of E1=ON1*α(0<α<1). In the preferred embodiment, α is set to 0.9. The timing detector 42 also detects activation of the second transistor T2 based on the second drive signal $D_L$ and drives the activation signal ACT in accordance with the detection. In this case, as described above, the activation signal ACT is negated immediately before the first transistor T1 is deactivated, that is, immediately before the second transistor T2 is activated. For example, the timing detector 42 detects activation of the second transistor T2 (deactivation of the first transistor T1) and asserts the activation signal ACT when the activated period of the second transistor T2 exceeds a second elapsed time E2. Further, the timing detector 42 re-negates the activation signal ACT long before the activation period of the second transistor T2 ends. In other words, the activation signal ACT is asserted during a predetermined period Tx2 (arbitrary period) from the second elapsed time E2 but is negated at a timing long before the second transistor T2 is deactivated. Based on an activation period ON2 (design value) of the second transistor T2 that is in accordance with the duty ratio, the second elapsed time E2 is set to satisfy the equation of E2=ON2*β (0<β<1). In the preferred embodiment, β is set to 0.1. Preferably, the timing detector 42 drives the activation signal ACT during the activation periods of the first and second transistors T1 and T2 but instead may drive the activation signal ACT during the activation period of only the first transistor T1. The timing detector 42 monitors the first and second elapsed periods E1 and E2 by, for example, counting a clock.

The logic circuit 44, which is connected to the timing detector 42, receives the first short circuit detection signal Sdc from the comparator 30 and generates the second short circuit detection signal Sdt based on the activation signal ACT from the timing detector 42 and the first short circuit detection signal Sdc. For example, in response to a high activation signal ACT, the logic circuit 44 generates the second short circuit detection signal Sdt, which has the same level as the first short circuit detection signal Sdc, with a predetermined pulse width (i.e., one-shot pulses).

The short circuit detection operation of the DC-DC converter will now be discussed with reference to FIG. 5.

At time ta, the first transistor T1 is activated and the second transistor T2 is deactivated. As a result, current $I_H$, which is in accordance with the current energy accumulated in the coil L (the current $I_L$ when the activated transistor is switched), flows to the output terminal 12. The current $I_H$ charges the capacitor C2 and increases the output voltage OUT. This gradually decreases the current $I_H$. As described above, the activation signal ACT is negated to a low level before time ta.

Figure 5:
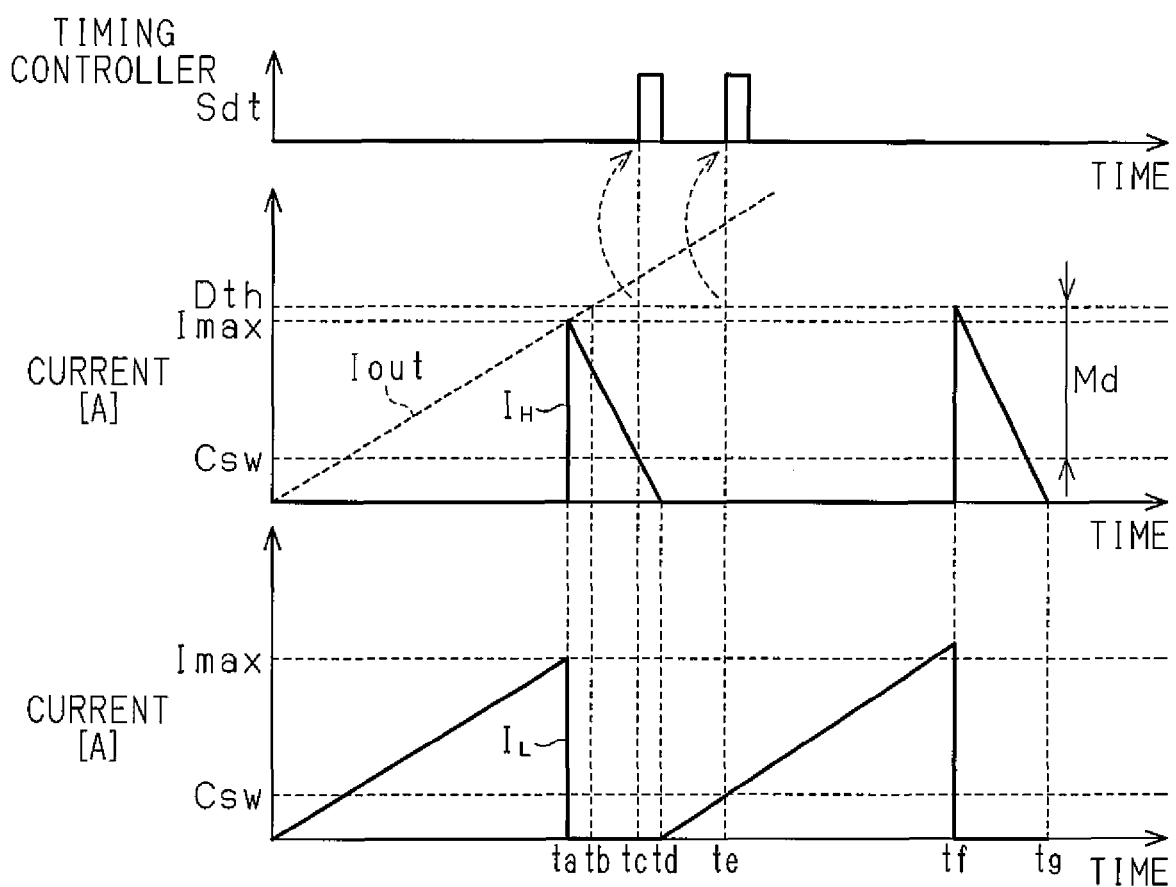
FIG. 5 is a timing diagram illustrating a short circuit detection operation performed by the DC-DC converter shown in FIG. 3.

When an output short circuit occurs, the output current Iout increases in a proportional manner as shown by the broken line in FIG. 5. When the output current Iout becomes greater than or equal to the short circuit detection threshold Dth at time tb, the comparator 30 generates the short circuit detection signal Sdc with a high level (not shown in FIG. 5). However, at time tb, the activation period from time ta is still less than the first elapsed time E1 (in the preferred embodiment 0.9* ON1), and the activation signal ACT output from the timing detector 42 is still low. Accordingly, the high first short circuit detection signal Sdc output from the comparator 30 is invalidated by the logic circuit 44 and the second short circuit detection signal Sdt provided to the PWM controller 20 remains low.

At time tc, the activation period of the first transistor T1 becomes equal to the first elapsed time E1 (i.e., tc=0.9*ON1+ ta). The timing detector 42 of the timing controller 40 generates the activation signal ACT with a high level from time tc over the predetermined period Tx1. The predetermined period Tx1 is shorter than the period from time tc to time td. This prevents erroneous detection caused by switching noise when the first transistor T1 is deactivated (i.e., when the second transistor T2 is activated). Based on the high activation signal ACT and the high first short circuit detection signal Sdc, the logic circuit 44 generates the second short circuit detection signal Sdt with a high level. Accordingly, at time tc, the timing controller 40 provides the PWM controller 20 with the high second short circuit detection signal Sdt.

In FIG. 5, when the first transistor T1 is activated at time tf even though an output short circuit is not occurring, the current $I_H$ flowing to the transistor T1 may become greater than or equal to the short circuit detection threshold Dth due to noise. In such a state, the comparator 30 generates the short circuit detection signal Sdc with a high level, as described above. However, at time tf, the activation signal ACT is low. Accordingly, as described above, the high first short circuit detection signal Sdc output from the comparator 30 is invalidated by the logic circuit 44, and the second short circuit detection signal Sdt provided to the PWM controller 20 remains low.

Figure 2:
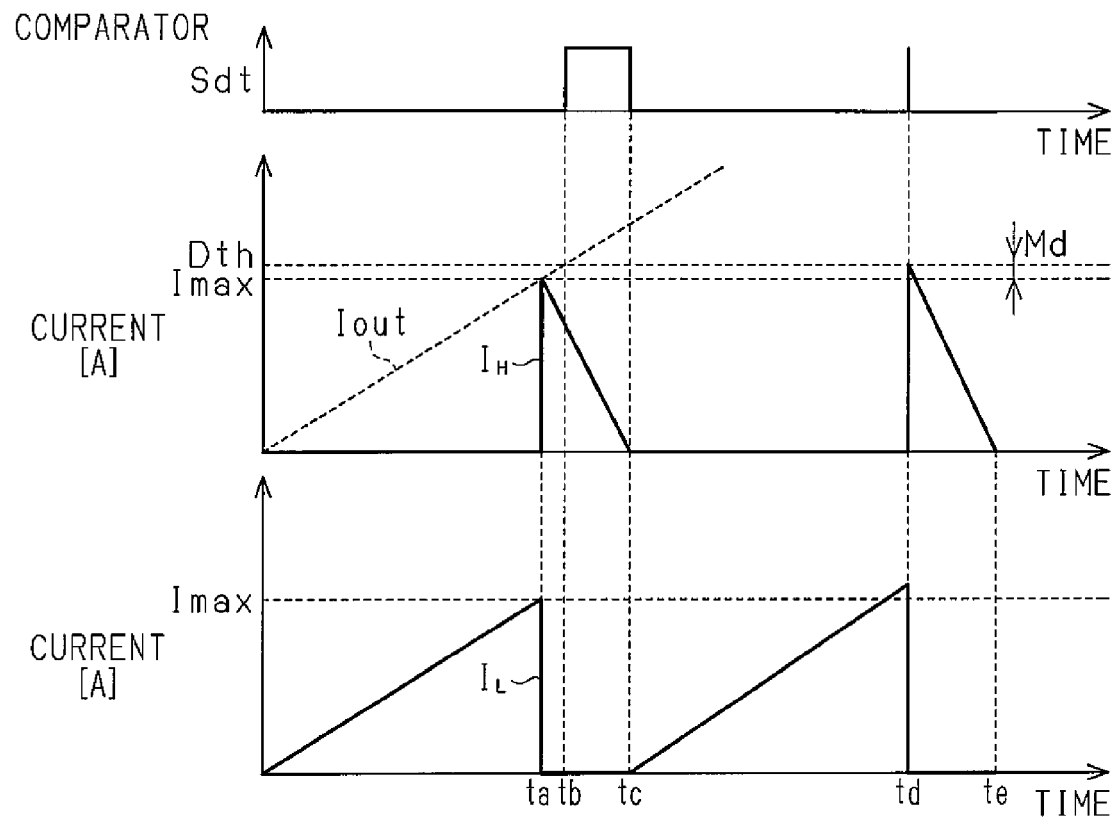
FIG. 2 is a timing diagram illustrating a short circuit detection operation performed by the DC-DC converter shown in FIG. 1.

In this manner, even when the comparator 30 detects an output short circuit, that is, even when the output current Iout is greater than or equal to the short circuit detection threshold Dth, the PWM controller 20 does not recognize the occurrence of an output short circuit as long as the activation signal ACT is low. Thus, the detection margin Md can be increased while keeping the short circuit detection threshold Dth set at a value close to the peak current Imax. As shown in FIG. 5, the detection margin Md is obtained from the difference between the short circuit detection threshold Dth and a current Csw of when the first elapsed time E1 elapses. The detection margin Md is much larger than that of the prior art shown in FIG. 2. This ensures prevention of erroneous detection resulting from noise.

Furthermore, the timing controller 40 drives the second short circuit detection signal Sdt from the first short circuit detection signal Sdc based on whether the activation period of the second transistor T2 has exceeded a second elapsed time E2. For example, the output current Iout may not exceed the short circuit detection threshold Dth during the period in which the first transistor T1 is activated even though an output short circuit is occurring (i.e., in the case shown in FIG. 5, the output current Iout may not exceed the threshold value Dth until time td). In such a case, when the activation period of the second transistor T2 becomes equal to the second elapsed time E2 (in the preferred embodiment, 0.1*ON2), the timing controller 40 provides the PWM controller 20 with the first short circuit detection signal Sdc output from the comparator 30 as the second short circuit detection signal Sdt (for example, in the case shown in FIG. 5, the second short circuit detection signal Sdt is output with a high level at time te). In this case, the detection margin Md is also the difference between the short circuit detection threshold Dth and the current Csw of when the second elapsed time E2 elapses. Further, the activation signal ACT is asserted during the predetermined period Tx2 from the second elapsed time E2. The predetermined period Tx2 is much shorter than the period from time te to tome tf. This prevents erroneous detection caused by switching noise when the second transistor T2 is deactivated (i.e., when the first transistor T1 is activated). Accordingly, detection of short circuit current is ensured, and erroneous detections are prevented.

The DC-DC converter 100 of the preferred embodiment has the advantages described below.

When the current activation period of the first transistor T1 exceeds the first elapsed time E1, the timing controller 40 provides the PWM controller 20 with the first short circuit detection signal Sdc from the comparator 30 as the second short circuit detection signal Sdt. Thus, the widened detection margin Md prevents erroneous detection caused by noise.

When the activation period of the second transistor T2 exceeds the second elapsed time E2, the timing controller 40 provides the PWM controller 20 with the first short circuit detection signal Sdc from the comparator 30 as the second short circuit detection signal Sdt. Accordingly, even when an output short circuit is not detected during the period in which the first transistor T1 is activated, detection of an output short circuit is ensured during the period in which the second transistor T2 is activated.

The short circuit detection threshold Dth may be set to a value that is close to the peak current Imax while widening the detection margin Md. Thus, the coil L used in the DC-DC converter 100 may be small. Accordingly, the circuit scale does not have to be increased and the regulator efficiency is not decreased.

It should be apparent to those skilled in the art that the present invention may be embodied in many other specific forms without departing from the spirit or scope of the invention. Particularly, it should be understood that the present invention may be embodied in the following forms.

The timing controller 40 (timing detector 42) may monitor both of the first and second elapsed times E1 and E2 based on the first drive signal $D_H$. In this case, the second drive signal $D_L$ is not provided to the timing detector 42.

The value of "α" set for the first elapsed time E1 is not limited to 0.9. Preferably, α is set to a value close to "1" in order to increase the detection margin Md. In the same manner, the value of "β" is not limited to 0.1. Preferably, β is set to a value close to "0" in order to increase the detection margin. Furthermore, α and β may have same or different values.

The timing controller 40 (timing detector 42) may use a first delay signal generated by delaying the first drive signal $D_H$ and/or a second delay signal generated by delaying the second drive signal $D_L$ to monitor the first and second elapsed times E1 and E2.

The timing controller 40 (timing detector 42) may monitor both of the first and second elapsed times E1 and E2 from a timing advanced from the predicted time at which the activation period of the drive signals $D_H$ and $D_L$ end.

The timing detector 42 may provide the logic circuit 44 with the activation signal ACT as a pulse generated over a certain period such as a one-shot. In this case, the logic circuit does not need to implement a one-shot function.

Instead of asserting the activation signal ACT during the predetermined period Tx2 from the second elapsed time E2, the timing detector may assert the activation signal ACT during a predetermined period Tx3 (arbitrary period) from a timing after the activation period of the second transistor T2 starts to a timing at which the activation period of the second transistor T2 becomes equal to the second elapsed time E2.

The present examples and embodiments are to be considered as illustrative and not restrictive, and the invention is not to be limited to the details given herein, but may be modified within the scope and equivalence of the appended claims.

What is claimed is:

1. A switching regulator, comprising:
   a first transistor;
   a second transistor connected in series with the first transistor and driven in a complementary manner with the first transistor;
   a comparator which compares output current, generated when the first and second transistors are driven, with a short circuit detection threshold and generates a first short circuit detection signal; and
   a timing controller which retrieves the first short circuit detection signal generated by the comparator at a predetermined timing and generates a second short circuit detection signal
   wherein the timing controller retrieves the first short circuit detection signal at the predetermined timing during a period in which the first transistor is activated.

2. The switching regulator of claim 1, wherein the timing controller retrieves the first short circuit detection signal as the second short circuit detection signal after a first elapsed time from when the first transistor is activated.

3. The switching regulator according to claim 1, wherein the timing controller retrieves the first short circuit detection signal at the predetermined timing during a period in which the second transistor is activated.

4. The switching regulator according to claim 3, wherein the timing controller retrieves the first short circuit detection signal as the second short circuit detection signal after a second elapsed time from when the second transistor is activated.

5. The switching regulator according to claim 1, wherein the timing controller includes:
   a timing detector that detects activation of the first transistor and generates an activation signal that is asserted when a first elapsed time elapses from when the first transistor is activated; and
   a logic circuit connected to the timing detector, which receives the first short circuit detection signal from the comparator and generates the second short circuit detection signal based on the activation signal and the first short circuit detection signal.

6. The switching regulator according to claim 5, wherein the timing detector further detects activation of the second transistor and asserts the activation signal when a second elapsed time elapses from when the second transistor is activated.

7. The switching regulator of claim 1, wherein the switching regulator is a step-up type DC-DC converter.

8. A method for detecting an output short circuit in a switching regulator, wherein the switching regulator includes a first transistor and a second transistor, which is connected in series with the first transistor and driven in a complementary manner with the first transistor, the method comprising:
   generating a first short circuit detection signal by comparing output current, generated when the first and second transistors are driven, with a short circuit detection threshold; and
   generating a second short circuit detection signal by retrieving the first short circuit detection signal at a predetermined timing when the first transistor is activated.

9. The method of claim 8, wherein said generating a second short circuit detection signal includes:
   detecting activation of the first transistor; and
   retrieving the first short circuit detection signal as the second short circuit detection signal after a first elapsed time from when the first transistor is activated.

10. The method according to claim 8, wherein said generating a second short circuit detection signal includes:
    retrieving the first short circuit detection signal at the predetermined timing during a period in which the second transistor is activated.

11. The method according to claim 10, wherein said generating a second short circuit detection signal includes:
    detecting activation of the second transistor; and
    retrieving the first short circuit detection signal as the second short circuit detection signal after a second elapsed time from when the second transistor is activated.

12. The method according to claim 8, wherein said generating a second short circuit detection signal includes:
    detecting activation of the first transistor;

generating an activation signal in response to said detecting, with the activation signal being asserted when a first elapsed time elapses from when the first transistor is activated; and
generating the second short circuit detection signal based on the activation signal and the first short circuit detection signal.

13. The method according to claim 8, wherein said generating an activation signal further includes:
    detecting activation of the second transistor; and
    asserting the activation signal when a second elapsed time elapses from when the second transistor is activated.

* * * * *